United States Patent [19]

Gupta et al.

[11] Patent Number: 4,785,040

[45] Date of Patent: Nov. 15, 1988

[54] PHENOLIC MOLDING MATERIALS AND PROCESSES

[75] Inventors: Manoj K. Gupta, Williamsville; Donald W. Hoch, Tonawanda; Gideon Salee, Williamsville, all of N.Y.

[73] Assignee: Occidental Chemical Corporation, Niagara Falls, N.Y.

[21] Appl. No.: 784,404

[22] Filed: Oct. 4, 1985

[51] Int. Cl.[4] .......................... C08K 7/16; C08K 3/34
[52] U.S. Cl. .................................. 524/445; 524/451; 524/594; 524/789; 524/790; 524/876
[58] Field of Search ............... 524/445, 451, 594, 789, 524/790, 876; 525/506; 528/140, 139

[56] References Cited

U.S. PATENT DOCUMENTS

| | | | |
|---|---|---|---|
| 2,424,787 | 7/1947 | Adams | 524/594 |
| 3,422,784 | 4/1966 | Boggs | 524/594 |
| 3,988,289 | 10/1976 | Clark et al. | 524/6 |
| 4,067,829 | 1/1978 | Garrett | 524/876 |
| 4,075,155 | 2/1978 | Philipps | 524/594 |
| 4,116,921 | 9/1978 | Olivo et al. | 528/137 |
| 4,182,701 | 1/1980 | Cottrell et al. | 524/594 |
| 4,210,562 | 7/1980 | McCombs | 524/594 |
| 4,403,066 | 9/1983 | Brode et al. | 524/876 |
| 4,419,400 | 12/1983 | Hindersinn | 428/245 |

FOREIGN PATENT DOCUMENTS 56-92927  7/1981  Japan .

*Primary Examiner*—Lewis T. Jacobs
*Attorney, Agent, or Firm*—James F. Tao; James F. Mudd

[57] ABSTRACT

Novel phenolic molding compositions comprise (1) a resole phenolic resin, (2) an alkaline earth metal hydroxide or oxide, and/or a silane compound, and (3) a mixture of clay and talc fillers and/or microballoons. The composition also generally contains a mold release agent, and a silane coupling agent. The alkaline earth metal hydroxide or oxide is preferably calcium and/or magnesium hydroxide or oxide. A mixture of the calcium and magnesium compounds is most preferred. The foregoing molding compositions are applied to glass fibers or filaments to provide compositions useful in sheet molding compound processes, pultrusion processes, filament winding, and continuous laminating processes, as well as in ram injection molding and transfer molding.

39 Claims, No Drawings

PHENOLIC MOLDING MATERIALS AND PROCESSES

BACKGROUND OF THE INVENTION AND PRIOR ART STATEMENT

This invention is in the field of phenolic molding compounds, and particularly in the fields of the newer phenolic molding technologies, such as sheet molding compound (SMC), pultrusion, filament winding and continuous laminating processes, as well as in ram injection molding and transfer molding.

Phenol-formaldehyde resins have long been mixed with fillers and used in phenolic molding compositions, which because of their thermosetting characteristics can be readily cured into hard, durable molded products. Such a phenolic molding composition is disclosed in U.S. Pat. No. 2,424,787. This patent discloses the use of both "one-stage" or resole and "two-stage" or novolak resins in the production of phenolic molding compositions. In the production of the resole resin molding compositions, the patentee discloses that it is necessary to mix the resin syrup with the filler, because of the liquid nature of the resin. The patentee discloses that in accordance with a preferred embodiment of the invention an alkali metal or an alkaline earth metal oxide including compounds of calcium and magnesium is incorporated in the molding composition with the phenolic resin and filler. Magnesium oxide is mentioned as particularly advantageous. The addition of the oxide to the molding composition causes the composition to harden at room temperature or at slightly elevated temperatures. However, this solidification does not convert the resin into the final infusible, insoluble stage and the solidified product may be easily molded under heat and pressure to form a satisfactory molded product.

Philipps in U.S. Pat. No. 4,075,155 of Owens-Corning Fiberglas Corporation, extended the use of phenol formaldehyde resole molding compositions to sheet molding compound (SMC) technology which heretofore have been generally limited to the use of polyester resins. Philipps discloses molding compositions that included fillers, compounds such as calcium hydroxide and magnesium hydroxide, mold release agents and coupling agents.

Another patent filed by Owens-Corning Fiberglas Corporation, U.S. Pat. No. 3,956,227, discloses phenolic molding compounds including cement which contains calcium oxide and further disclosed the use of silane coupling agents. Sheet molding compounds were disclosed by the patentees. Related patents include U.S. Pat. Nos. 3,944,515 and 3,988,289. A later patent U.S. Pat. No. 4,182,701, was directed to phenolic molding compounds made by mixing the phenol and aldehyde reactants together with calcium hydroxide and a silane coupling agent. Use of calcium hydroxide and magnesium hydroxide during the reaction of the phenolic resin is also disclosed in U.S. Pat. No. 4,070,331.

In the same period, Olivo et al in U.S. Pat. No. 4,116,921 disclose phenolic molding compounds made from formaldehyde and bisphenol. The patentees disclose the use of calcium oxide or hydroxide in the molding compounds. These patentees also disclose the use of hollow carbon and hollow phenolic resin microballoons.

Another approach to making phenolic sheet molding compounds is disclosed in British patent No. 1,363,227 to Farkas. The patent discloses sheet molding compounds made from a phenol aldehyde resole resin that is modified with a glycol. The resins are cured with acids. Resins that are modified with oligomers are disclosed in U.S. Pat. No. 4,419,400.

There are several patent applications published in Japan, dealing with this technology. In a Dainippon application published as Sho-No. 56-92927, sheet molding compounds are disclosed which contain resole phenolic resins, calcium and/or magnesium hydroxides or oxides and fillers such as talc, clay and the like. The use of a silane coupling agent is not disclosed and the working examples are limited in scope to the use of calcium hydroxide and aluminum trihydrate as the principal filler.

In Japanese Patent Publication Sho-No. 58-91935 (also Dainippon), phenolic molding compounds which contain resole phenolic resins, a thickener, such as the oxides or hydroxides of calcium and magnesium, fillers and reinforcing materials are combined with abrasive materials for use in brake shoes. Sheet molding compound technology is used in forming the brake shoes.

In Sumitomo Bakelite Japanese Publication Sho-No. 59-170126, sheet molding compounds made with resole phenolic resins, alkaline earth metal oxides or hydroxides are impregnated into special configurations of continuous and discontinuous glass fibers.

Despite these disclosures in the literature, there remains the fact that no truly commercially attractive base catalyzed phenolic resin sheet molding compound has been put on the market and used to any extent.

Accordingly, it is an object to this invention to provide commercially attractive sheet molding compositions made from phenolic resole resins, and also to provide novel technology that can be employed advantageously in some of the newer molding techniques including sheet molding compound, pultrusion, filament winding and continuous laminating processes.

SUMMARY OF THE INVENTION

The foregoing objects of the invention are fulfilled by novel phenolic molding compositions comprising (1) a resole phenolic resin, (2) an alkaline earth metal hydroxide or oxide, and (3) a mixture of clay and talc fillers. The composition also generally contains (4) a mold release agent, and (5) a silane coupling agent. The alkaline earth metal hydroxide or oxide is preferably calcium and/or magnesium hydroxide or oxide. A mixture of the calcium and magnesium compounds is most preferred. The hydroxides provide better shelf life for the molding compounds. The foregoing molding compositions are applied to glass fibers or filaments to provide compositions useful in sheet molding compound processes, pultrusion processes, filament winding, and continuous laminating processes, as well as in ram injection molding and transfer molding.

In the sheet molding process, control of the viscosity of the resinous composition laid down on the moving sheet of plastic film is very important to successful sheet molding compound operations. We have found that use of calcium oxide or hydroxide as a thickening agent causes rapid hardening of the sheet molding compound. Use of magnesium hydroxide or oxide alone as a thickening agent results in a slow hardening rate. A mixture of calcium and magnesium oxides or hydroxides provides excellent control of viscosity of the plastic mass, also referred to as a treating mix, on the moving sheet.

Similarly, when talc alone is used as the filler, the viscosity of the plastic mass increases rapidly. When clay alone is used as the filler, the viscosity of the mix increases slowly. But excellent viscosity control is achieved when a mixture of talc and clay is used.

It has been discovered that use of certain silanes under controlled conditions catalyzes the curing of the sheet molding compound. Thus, unexpectedly it has been found that the silane coupling agent catalyzes the hardening and curing of the phenolic sheet molding compound.

It has been further discovered that the incorporation of microspheres or microballoons in the sheet molding compounds lowers the requirement for filler level. Thus, Japanese Sho-No. 56-92927 teaches that a filler level in the range of 30 to 200 parts by weight of filler per 100 parts by weight resin should be used. As low as about 1 up to 30 parts by weight of microspheres per hundred parts by weight of resin, and preferably about 10 up to 30 parts by weight, is effective as the sole filler component.

The cured products of the invention have low flammability and produce low smoke and low toxic emissions in the presence of a fire. The cured products of the invention have high strength, good dimensional stability and good thermal stability.

The compositions of the invention can be used to produce various shaped articles and laminated products. The compositions can be used to manufacture panels, parts and shapes for use in the transportation and construction industry, and consumer products such as furniture and other articles.

DESCRIPTION OF THE PREFERRED EMBODIMENTS

The Phenolic Resins

The phenolic resins useful in the practice of the invention are characterized in the art as resole resins. Phenolic resole resins are generally prepared by reacting a phenol with an excess molar proportion of an aldehyde in the presence of an alkaline catalyst.

Examples of phenols which can be used in preparing a phenol aldehyde resole for use in practicing the invention include ortho-para-directing hydroxy or amino aromatic compounds having 6 to 24 carbon atoms such as phenol itself ($C_6H_5OH$), naphthol, anthranol and substituted derivatives thereof where the substituents on the aromatic compound are independently selected from hydrogen; halogen such as Cl, Br, and F; $NH_2$ and hydrocarbon radicals such as:

a. alkyl groups or radicals of 1 to 12 carbon atoms, preferably of 1 to 9 carbon atoms, and their various isomeric forms and substituted on the aromatic nucleus in the ortho or para position;

b. cycloalkyl groups of 5 to 12 carbon atoms such as cyclohexyl, cyclopentyl, methylcyclohexyl, butylcyclohexyl, and so forth;

c. aryl ketonic groups wherein the hydrocarbon portion is as defined below in (e);

d. alkyl, aryl and cycloalkyl carboxylic groups wherein the hydrocarbon part is defined as above in (a) and (b);

e. aryl groups of 6 to 24 carbon atoms such as phenyl, naphthyl, anthryl, and the like;

f. aryl substituted alkyl wherein the aryl is phenyl which may contain lower alkyl and/or hydroxy substituents so that the resulting hydroxy aromatic is, for example, a bisphenol;

g. the oxyhydrocarbon radicals corresponding to the foregoing hydrocarbon radicals; and h. mixtures of the aforesaid hydroxy aromatics.

Suitable substituted phenols include meta-cresol, m-propyl phenol, m-isobutyl phenol, m-sec-butyl phenol, m-tert-butyl phenol, m-bromo phenol, m-chloro phenol, m-phenyl phenol, m-benzyl phenol, m-cetyl phenol, m-cumyl phenol, m-hydroxyacetophenone, m-hydroxybenzophenone, m-d-limonene phenol. The corresponding phenols substituted in the ortho and para-positions can be used in part but are not preferred.

Mixtures of various hydroxy aromatic compounds mentioned herein also may be used.

Included among the phenolic reactants which may be used are those known as the "cresylic acids" and these often comprise heterogeneous mixtures having two reacting hydrogen positions on each of them; that is, compounds unsubstituted in the ortho- and para-positions, and hence, yield relatively unreactive resins. These compounds may include the following: 3,5-xylenol, m-cresol, 3-4-xylenol, 2,5-xylenol, 2,3-xylenol, phenol, p-cresol, o-cresol, 2,4-xylenol, and 2,6-xylenol. Cresylic acids or tar acids may include phenol and its homologs which may include cresols, xylenols, trimethyl phenols, ethyl phenols, and higher boiling materials such as dihydroxy phenols, polycyclic phenols and the like. They are often obtained by a low-temperature trimerization of coal, lignite, and the like, or a conventional high-temperature coke oven tar, or the liquid product of petroleum cracking both thermo and catalytic, shell oil, coal hydrogenation products, and the like.

Polyhydroxyaromatic reactants, such as resorcinol, may also be used.

Also useful in this invention are mixtures of aniline and phenol to react with an aldehyde or ketone to produce either a novolak or a resole, depending on the other conditions described above.

Also useful in the invention are mixtures of urea and phenol to react with the aldehyde or ketone to produce a resole.

Among the aldehydes which may be used within the scope of this invention to produce resoles are formaldehydes or any of its variations, such as 37 percent or higher concentrations of formalin, or paraldehyde, acetaldehyde, propionaldehyde, isobutyraldehyde, isopentaldehyde, and the like. The aldehyde should have not more than 8 carbon atoms and should not detrimentally affect the resinification of the resin. Preferred aldehydes are those having from 1 to 4 carbon atoms, such as formaldehyde, which may be in aqueous solution (37 percent or higher), or in any of its low polymeric forms such as paraformaldehyde or trioxane. Other aldehydes include para-aldehydes, furfural, 2-ethylhexanal, ethylbutyraldehyde, heptaldehyde, benzaldehyde and crotonaldehyde.

The liquid one-stage resin (resole) which forms a part of this invention may be formed by reacting a hydroxy aromatic compound with at least one and up to three moles of aldehyde per mole of hydroxy mono-aromatic compound in alkali such as sodium hydroxide dissolved in water. The ratio of aldehyde to phenol is preferably in the range of about 1.1:1 to 2.5:1. The reaction mixture is gradually heated to reflux and held at elevated temperatures of about 60° C. up to the reflux temperature until less than about two percent of free formaldehyde remains. Less than two percent free CH₂O is desirable. The reaction mixture is then cooled and the catalyst can but need not be neutralized with an acid such as glacial acetic or sulfuric acid. The pH is adjusted to roughly 5 to 8. The resin is then dehydrated to about 60 to 80 percent solids.

The alkaline caralyst used in preparing the resoles to be used in this invention may be any of those known in the art; for instance, sodium hydroxide and calcium hydroxide. In general, the alkali metal hydroxides and the alkaline earth metal hydroxides and ammonium hydroxide and the amines such as triethanol amines may be used.

Following condensation reaction to form a resole, a stoichiometric quantity of an acid such as sulfuric acid, or acetic acid, and the like, can be added to the reaction mixture in order to neutralize the alkaline condensation catalyst. Sulfuric acid is conveniently employed to neutralize a sodium hydroxide catalyst. The final resin should have a pH of about 5 to 7 for better stability.

The Catalysts

The resole phenolic resins of the invention are reacted and cured with an alkaline earth metal hydroxide or oxide, preferably mixtures of more than one such alkaline earth metal hydroxide or oxide. The alkaline earth metals include magnesium, calcium, and barium. The preferred alkalne earth metals are magnesium, and calcium and mixtures thereof. Certain silane compounds have been found to catalyze the cure of the resole resin of the invention. The catalyst can be used in a proportion of about 1 to 15 weight percent of the molding compound.

The Filler

The preferred fillers are clay and talc and mixtures thereof. Aluminum trihydrate and various microspheres such as glass, ceramic and organic spheres also give good results. Auxiliary inorganic or organic fillers are those fillers normally used in phenolic molding compounds. Suitable such filler materials include silicates, aluminates, carbides, carbon, carbonates, metals, rock, mineral, sulfates, oxides, mica, wollastonite and the like.

The fillers are used in various proportions depending on the process by which reinforced plastic articles are to be made.

Thus, bulk molding compounds in accord with the invention contain a high loading of filler, generally in the range of about 20 to 300 parts by weight of filler per 100 parts by weight of resin.

The sheet molding compounds generally contain lower loadings of filler such as about 20 to about 150 to 200 parts by weight of filler per 100 parts by weight of resin.

The compounds used for pultrusion processing, continuous lamination and filament winding contain much lower filler loadings, and do not necessarily contain any filler. The range of filler content is 0 to about 50 weight percent filler, preferably 0 to about 10 weight percent filler based on the weight of resin.

The Silanes

A variety of silane compounds known in the art are suitable for use in the compositions of the invention. One class of such silanes are the aminoalkylsilanes. A particularly suitable aminoalkylsilane is gamma-aminopropyltriethoxysilane which is commercially available from Union Carbide under the product designation "A-1100" and "A-1102" and from General Electric under the product designation "SC-3900". Also suitable is N-beta (aminoethyl) gamma-aminopropyltri-methoxysilane commercially available from Union Carbide under the product designation "A-1120" and from Dow Corning under the product designation "Z-6020".

The organo silanes generally contain at least two hydrolyzable silane groups having the formula: $(RO)_3SiR'Si(OR)_3$ wherein each R is an alkyl or aryl group containing from one to ten carbons and R' is an alkylene or phenylene group containing from one to fifteen carbons.

The silane compound is preferably used in a proportion of about 0.1 to 10 parts by weight per 100 parts of phenolic molding composition, and preferably about 0.25 to 2 parts.

Mold Release Agent

The mold release agents normally used with phenolic molding compounds are employed in the compositions of the invention. Among these are stearic acid and metal salts thereof such as zinc, calcium and magnesium stearates. Organic compounds such as glycerol monostearate can be used.

Bulk and Sheet Molding Compounds

The phenolic resin compositions of the invention are used to produce bulk or sheet molding compounds by blending the resins with inert fibers and inert fillers.

Suitable inert fibers are glass fibers of varying lengths in the range of 1.5 to 50 millimeters. The resins of the invention are particularly suited to use with long glass fibers which are particularly capable of giving high strength products. Long glass fibers generally have a length in the range of about 12 to 50 millimeters. Other inorganic and organic fibers include carbon, graphite, ceramics, polyester, aramid and polyacrylonitrile.

In the bulk molding compounds of the invention the resin is generally employed in the range of about 20 to about 40 weight percent of the bulk molding compound, the fibers are employed in the range of about 10 to about 30 or as high as 50 weight percent. Catalysts are generally employed in a proportion of about 1 to 15 weight percent of the bulk molding compound. Silanes are generally employed in a range of about 0.1 to 10 weight percent of the bulk molding compound, preferably about 0.25 to 2 percent. Except for other minor additives that may be optionally employed, the remainder of the bulk molding compound is comprised of the fillers. The bulk molding compounds of the invention generally have a viscosity in the range of about 100,000 to about 500,000 centipoises at 33° C.

The sheet molding compounds of the invention are prepared employing the resins, fillers, inorganic or organic fibers and other additives such as just described in the bulk molding processes. In one such process for making sheet molding compound, the resin is mixed with inorganic fillers containing a divalent base to form a treating mix wherein the ratio of the resole to fillers is in the range of about 4:1 to about 1:5. The treating mix is flowed onto a first sheet which is preferably a thin plastic sheet such as polyethylene, polystyrene and polypropylene, and the like. A layer of chopped fibers is added to the layer on the first sheet. The treating mix has a controlled viscosity such that it flows onto the sheet to form a layer of uniform thickness, and to properly wet the fibers. The treating mix for sheet molding compounds generally has a viscosity in the range of about 8000 to about 30,000 centipoises at 33° C. A second layer of treating mix is placed on top of the layer of fibers. The resulting composite is passed between a series of rollers to form a mechanically handleable sheet molding compound. The resulting compound is rolled up and stored in a warm room at about 30° to 70° C., preferably about 35° to 55° C. for 24 to 100 hours and to form a strippable, moldable sheet molding compound. The resulting product is readily moldable at elevated temperatures to produce a variety of products such as structural panels for use in the transportation industry and in the construction industry.

The Pultrusion Process

The pultruded products of the invention are produced by passing a filament component, preferably in a continuous form such as a filament, roving or thread, into a bath or vessel of a low viscosity treating mix in which the filament component is saturated with the resin component. The viscosity for the treating mix is generally in the range of about 1000 to about 3000 centipoises at 33° C. Next, the resin saturated filament component is passed through one or more suitable orifices having a smaller dimension than the composite of the resin saturated filament component. The orifice functions to squeeze out the excess liquid resin to maintain the ratio of resin to filament constant in the process and to compress the resin-filament composite to the proper dimensions. Thereafter, the resin-filament composite may optionally be passed through a preheater so that the composite is cured more rapidly in subsequent steps of the process. The resulting preheated resin-filament composite is passed through an extrusion die which functions to heat and finally cure the resin component. The cured resin filament composite is pulled as a continuous strand from the pultrusion die with the aid of a suitable puller mechanism, commonly a pair of automatic pulling devices. The cured product can be cut into suitable length in a suitable cutting device. The process and apparatus for producing the products of the invention are disclosed in U.S. Pat. Nos. 3,244,784 and 4,419,400, the disclosures of which are incorporated herein by reference.

Various filamentary materials may be used in producing the products of the invention such as glass, graphite and polymers, such as aromatic polyamides, for example Kevlar filaments. The preferred filament component is glass fiber in the many forms available commercially. The above-described filamentary materials can be employed in various physical forms as described in U.S. Pat. No. 4,419,400.

Continuous Laminating Process

The continuous laminating of the compositions of the invention consists of impregnating various reinforcements with resin on an in-line conveyor. The resulting laminate is cured and trimmed as it passes through the various zones of the conveyor.

The resin mix is metered onto a carrier film or, in some cases, it is metered onto a stainless steel belt. The viscosity of the resin compositions for use in this process is generally in the range of about 1000 to 3000 centipoises at 33° C.

The metering is usually controlled by a doctor blade. Some processes can apply a continuous gel coat. The first carrier film, which creates the panel's surface, generally is polyethylene, polypropylene, polystyrene and the like, and can be smooth, embossed, or matte finish.

The glass free-falls into the resin mix and is allowed to wet out. Mechanical compactors can be used to accelerate the wet out process. A second carrier film is used to encapsulate the resin and glass mix. The resulting envelope is pulled through a set of squeeze rollers to eliminate any entrapped air and to set the sheet thickness.

Next, the laminate enters a heated cure area. Inside this cure area, the sheet is formed either by wood or metal shoes into a desired configuration. If the sheet is to be made flat, most machines use some sort of tenter device to maintain even tension on the film across the sheet.

When the laminate is fully cured and leaves the area, the release film is stripped from the sheet, and the sheet is trimmed to its final width by saws, slitters, or high pressure water jets. Then the sheet is cut to its finished length.

Products of the continuous laminating process are useful in panels for trucks and trailers, building panels and for lightweight garage doors.

Filament Winding Process

Filament winding is a process that employs a series of continuous resin-impregnated fibers applied to a rotating mandrel in a predetermined geometrical relationship under controlled tension. The most evident advantage of the process is that continuous strands of the reinforcement can be oriented in the axis of load on the finished product. The continuous reinforcement, locked within the resin matrix carries more load than a random chop laminate, thus thinner wall thicknesses are achieved. Filament-wound products also have a high strength-to-weight ratio and impact resistance. The filament winding process applies a series of reinforcements drawn through a resin bath mounted on a moving carriage. The viscosity of the resin treating mix is in the range of about 1000 to 3000 centipoises at 33° C. While the mandrel rotates about its central axis, the carriage traverses from end to end of the mandrel, until the desired wall thickness is built up. The composite is cured and the mandrel extracted.

Glass, graphite and aramid fibers are most commonly used as reinforcements. In some cases, boron, high tensile wire, and even thin metallic ribbons have been used. Glass fiber reinforcements are most widely used in filament-wound composites for economic reasons. However, aramid and graphite are now becoming important reinforcements. By mixing graphite or aramid and glass fibers together and selectively orienting these fibers at precise locations within the laminate, it is possible to achieve desired performance while retaining cost effectiveness. All reinforcements must have an effective binder coating to develop and bond during the filament winding process. Preimpregnated reinforcements offer good quality control and eliminate the wetout process on the winding machine.

Products of the filament winding process are used in the aerospace, military and automotive market for applications ranging from small parts to automotive leaf springs and helicopter blades.

Ram Injection and Transfer Molding

These processes utilize compositions referred to as bulk molding compounds (BMC), as well as the sheet molding compounds (SMC). In the transfer molding process, the molding compound is generally first formed into a "pre-form" or compacted compound mass. The pre-forms are introduced to a hopper from which they fall into the path of a reciprocating ram, that forces the pre-form into a pre-heated mold of the desire shape. In the ram injection process, a feed screw serves to feed the molding material into the path of a main injection screw. The SMC can provide a convenient charge material for feeding these processes.

The following examples are given to further illustrate the invention. Unless otherwise indicated in this specification and claims, all parts are by weight and temperatures are degrees Celsius.

The physical properties of the molded products were run in accordance with the following test procedures:
Tensile Strength: ASTM--D638
Tensile Modulus: ASTM--D638
Flexural Strength: ASTM--D790
Flexural Modulus: ASTM--D790
Heat Distortion Temperature: ASTM--D648
Izod Impact: ASTM--D256

Viscosity of Mixture was measured by a Brookfield viscometer following ASTM method D1824, using Number 5 spindle. Five measurements were made and the average of the five measurements is reported. In certain cases, readings did not stabilize and the average of the first and last readings was determined and recorded.

Normalized Viscosity was determined by placing a mixture of resin and filler in a water bath operated at several different temperatures. The viscosity at each temperature was measured using the Brookfield viscometer. The viscosity and temperature data were fitted on a computer and the best equation was used to normalize the viscosity at a common temperature.

EXAMPLE 1

The components listed in Table 1A were used to prepare molding compounds. The liquid resole resin was a commercially available resin having the following average properties.
- Formaldehyde to phenol ratio: 1.4 to 1
- Specific gravity @25° C.: 1.205
- Solids content @135° C.: 69 percent
- Viscosity @25° C.: 135 cp
- Cure Time @165° C.: 33 seconds.
- Water Tolerance: Infinite
- pH: 8
- Free Formaldehyde, percent: 2 max.

In Example 1, the only variable was the ratio of magnesium hydroxide to calcium hydroxide. The proportions employed are shown in Table 1B.

In preparing the molding compounds, the clay, talc, zinc stearate, magnesium hydroxide and calcium hydroxide were roll-milled for about ½ hour to prepare a filler mixture. The silane coupling agent and anti-foaming agent were added to the resin and were then mixed on a high speed mixer such as a Cowles Mixer. Then the filler mixture was slowly added to the resin mixture over a period of three to five minutes. The temperature and Brookfield viscosity of the resulting mixture were recorded. The resulting mixture was then transferred to a Baker Perkins Mixer and glass was slowly added over a period of five to ten minutes. The final mixture was divided into six parts, each part weighing about 270 grams. The divided portions were then placed between polyethylene sheets and rolled into thin sheets of about ⅛ inch in thickness. After allowing the molding compounds to thicken by standing for one week at room temperature, the molding compounds were molded at a force of 470 pounds per square inch, a temperature of 325° F. and using a curing cycle of 1.5 minutes and a breathing cycle of about 3 to 5 seconds. The properties of the molded and cured sheets are shown in Table 1B.

TABLE 1A

| COMPONENT | WEIGHT/GRAMS |
| --- | --- |
| Liquid resole resin | 618 |
| Paragon clay | 287.5 |
| Uncoated Mistron Talc | 287.5 |
| Zinc stearate | 18 |
| Gamma-amino propyl triethoxy silane | 25.8 |
| Foamaster III, anti-foam agent | 0.2 |
| Ca(OH)$_2$ and Mg(OH)$_2$ | 49.6 (total) |
| Fiberglass, OCF 847 (¼ inch) | 364 |

TABLE 1B

| | Catayst/Parts by Weight | | | | | |
| --- | --- | --- | --- | --- | --- | --- |
| Mg(OH)$_2$ | 100 | 80 | 4.38 | 40 | 20 | 0 |
| Ca(OH)$_2$ | 0 | 20 | 40 | 60 | 80 | 100 |
| | Properties | | | | | |
| Tensile Strength ($\times 10^3$) psi | 3.73 | 4.70 | 60 | 5.16 | 6.30 | 6.45 |
| Tensile Modulus ($\times 10^3$) psi | 1.17 | 1.12 | 1.28 | 1.15 | 1.10 | 1.13 |
| Flexural Strength ($\times 10^3$) psi | 8.63 | 10.50 | 10.90 | 10.20 | 10.30 | 11.60 |
| Flexural Modulus ($\times 10^6$) psi | 1.08 | 1.19 | 1.23 | 1.13 | 1.12 | 1.19 |
| Notched Izod Impact ft-lb/inch | 2.07 | 1.86 | 2.35 | 1.78 | 1.67 | 1.91 |
| Viscosity of Mixture, ($\times 10^3$) cps | 45 | 52 | 51 | 55 | 48 | 53 |
| Temperature, °C. | 27 | 33 | 36 | 40 | 44 | 50 |
| Normalized Viscosity at 33° C. ($\times 10^3$) cps | 13 | 52 | 83.8 | 137.5 | 161 | 246 |

EXAMPLE 2

The components listed in Table 2A were used to prepare molding compounds. The only variable was the ratio of clay to talc. The proportions employed are shown in Table 2B. The same liquid resole resin was used as in Example 1.

The molding compounds were prepared and molded using the procedure of Example 1. The properties of the molded and cured plaques are shown in Table 2B.

TABLE 2A

| Component | Weight/Grams |
| --- | --- |
| Liquid resole resin | 618 |
| Paragon clay and uncoated mistron talc | 575 (total) |
| Zinc stearate | 18 |
| Gamma-aimino propyl triethoxy silane | 25.8 |
| Foamaster III, anti-foam agent | 0.2 |
| Calcium hydroxide | 24.8 |
| Magnesium hydroxide | 24.8 |
| Fiberglass, OCF 847 (¼ inch) | 364 |

TABLE 2B

| | Filler/Parts by Weight | | | | | |
| --- | --- | --- | --- | --- | --- | --- |
| Clay | 100 | 80 | 60 | 40 | 20 | 0 |
| Talc | 0 | 20 | 40 | 60 | 80 | 100 |
| | Properties | | | | | |
| Tensile Strength ($\times 10^3$) psi | 5.5 | 6.3 | 5.9 | 5.5 | 6.2 | 5.0 |
| Tensile Modulus ($\times 10^6$) psi | 1.31 | 1.39 | 1.29 | 1.31 | 1.57 | 1.39 |
| Flexural Strength ($\times 10^3$) psi | 12.00 | 11.50 | 11.90 | 10.00 | 14.0 | 9.40 |

TABLE 2B-continued

| | Filler/Parts by Weight | | | | | |
|---|---|---|---|---|---|---|
| Flexural Modulus ($\times 10^6$) psi | 1.38 | 1.44 | 1.40 | 1.27 | 1.65 | 1.21 |
| Notched Izod Impact ft-lb/inch | 1.02 | 1.13 | 1.19 | 1.22 | 1.88 | 1.67 |
| Viscosity of Mixture, ($\times 10^3$) cps | 7 | 10 | 45 | 115 | 270 | 1000 |
| Temperature, °C. | 33 | 33 | 40 | 40 | 40 | 45 |
| Normalized Viscosity at 33° C. ($\times 10^3$) cps | 7 | 10 | 95 | 245 | 576 | 2941 |

EXAMPLE 3

Example 1 of Dainippon Patent Publication SHO No. 56-92927 was recreated using formulation (I) shown in Table 3A. In formulation (I), the commercial resin used in Examples 1 and 2 was employed. Formulations (II) and (III) also contained the commercial resin used in Examples 1 and 2, but otherwise were in accordance with the present invention. Formulations (I), (II), and (III) were processed to make sheet molding compounds by depositing a layer of the formulation on two sheets of polyethylene, depositing glass fibers on one of the layers of formulation and then laying the second layer of formulation face down on the first layer. The layers were squeezed to form a sheet molding compound. The sheet molding compounds were allowed to thicken by standing at 40° C. for 3 hours after mixing. The sheet molding compounds were molded at a force of 470 pounds per square inch, a temperature of 300° F. using a cure cycle of 5 minutes and a breathing cycle of about 3 to 5 seconds.

Properties of the molded and cured molding compounds from formulations (II) and (III) are shown in Table 3B. It was found that in the plaques made with formulation (I), the glass fiber concentrated in the middle portion, leaving most of the resin on the peripheral area. The area with high resin content was so friable that it could not be tested. Thus no representative or meaningful properties could be determined.

TABLE 3A

| Formulation | I | II | III |
|---|---|---|---|
| Liquid resole resin | 600 | 600 | 600 |
| Phenol sulfonic acid | 24 | 0 | 0 |
| Magnesium hydroxide | 36 | 36 | 36 |
| Calcium hydroxide | 0 | 24 | 24 |
| Aluminum Trihydrate | 600 | 0 | 0 |
| Uncoated Mistron Talc | 0 | 300 | 120 |
| Paragon Clay | 0 | 300 | 480 |
| Gamma-amino propyl triethoxy silane | 0 | 24 | 24 |
| Stearic Acid | 12 | 12 | 12 |
| Fiberglass, OCF 847 (¼ inch) | 545 | 545 | 545 |

TABLE 3B

| Properties - Products of Example 3 | | | |
|---|---|---|---|
| FORMULATION | I | II | III |
| Tensile Strength ($\times 10^3$) psi | * | 3.75 | 3.56 |
| Tensile Modulus ($\times 10^6$) psi | * | 1.41 | 1.31 |
| Flexural Strength ($\times 10^3$) psi | * | 9.23 | 7.90 |
| Flexural Modulus ($\times 10^6$) psi | * | 1.34 | 1.24 |
| Notched Izod Impact ft-lb/inch | * | 2.32 | 2.32 |

*Glass and resin segregated to prevent determination of meaningful value.

EXAMPLE 4

A commercially available water soluble resole resin, having the following average properties
- Formaldehyde to Phenol Ratio: 1.4 to 1
- Specific gravity @25° C.: 1.205
- Solids Content @135° C.: 69 percent
- Viscosity @25° C.: 135 cp
- Cure Time @165° C.: 33 seconds
- Water Tolerance: Infinite ,
- pH 8
- Free Formaldehyde, %: 1.4 was used to formulate a treating composition having the components shown in Table 4.

The calcium hydroxide, magnesium hydroxide, paragon clay and zinc stearates were added to a ball mill and mixed to a uniform dispersion in one hour.

The liquid amino-silane was added to the resole at 20° C. and mixed for three minutes with an air stirrer. The temperature of the resin-silane mixture increased to 26° C. The ball milled dry mixture was added slowly to the resin-silane mixture in a high speed mixer an extra 5 minutes or until there was a thin, uniform paste. Temperature of the mixture increased to 30°-35° C. and the Brookfield viscosity was 1000-1200 centipoises as measured at this temperature. The viscosity was measured using an LVF Brookfield Viscometer, using a No. 5 spindle at 6 revolutions per minute.

Thereafter, continuous strand roving known commercially as Pittsburgh Plate Glass Company 713NT, yield 225 was drawn through the treating mix and through a 24-inch long heated die at the rate of 16 inches per minute. The die was 0.25 inch square and had three heating zones. The entrance zone was heated to 300° F., the middle zone to 340° F. and the exit zone temperature was 310° F. There were no release problems and the pultrusion line could be started and stopped at will. Mechanical properties of the pultruded 0.25 inch rod were as follows:
- Tensile Strength, psi: 57303
- Flexural Strength, psi: 57119
- Compressive Strength, psi: 24438

TABLE 4

| Component | Weight/Grams |
|---|---|
| Liquid Resole Resin | 400 |
| Calcium Hydroxide | 16 |
| Magnesium Hydroxide | 16 |
| Paragon Clay | 50 |
| USP Zinc Stearate | 10 |
| Gamma-amino propyl triethoxy silane | 10 |

EXAMPLE 5

A treating mix was prepared as in Example 4, except that the resin had the following properties
- Formaldehyde to Phenol Ratio: 1.28 to 1
- Specific Gravity @25° C.:1.21.
- Solids Content @135° C.: 73 percent
- Viscosity @25° C.: 300 cp.
- Cure Time @165° C.: 48 sec.
- Cure Time @150° C.: 78 sec.
- Water Tolerance: 500% Min.

The viscosity of the finished treating mix was 1200-1400 centipoises.

A continuous strand roving sold by Pittsburgh Plate Glass Company under the designation 1062 was drawn through the treating mix and wound onto a ¼ inch rotating mandrel for a thickness of 1-1/6 inch. The filament wound tube was cured in an oven at 310° F. for 30 minutes and the mandrel was withdrawn. The resulting filament wound tube exhibited no visible defects, it was 6/16 inch in diameter and had a wall thickness of 1/16 inch. The filament wound tube had a compressive strength of 24,438 psi.

EXAMPLE 6

The unexpected catalytic effect of using silane compounds in the molding compositions of the invention was demonstrated as follows:

To a phenol formaldehyde resole resin was added 4.2 weight percent of gamma-amino propyl triethoxy silane. Then samples of the resin with and without the silane additive were subjected to differential scanning colorimetry (DSC) to determine the peak exotherm temperature. Peak exotherm temperature is a measure of the exotherm during the curing of the resin.

The peak exotherm temperature was 210° C. for the specimen with no silane additive, but only 168° C. for the specimen with the silane additive. This indicated that the silane compound was catalyzing the resin cure.

EXAMPLE 7

The relative effects on the properties of treating mix and molded articles, of the mixtures of magnesium hydroxide and calcium hydroxide, and the silane coupling agent were measured.

In formulation I shown in Table 7A, both the mixture of magnesium hydroxide and calcium hydroxide and the silane compound were employed. In formulation II, the silane compound was omitted. In formulation III, the mixture of alkaline earth metal hydroxides was omitted.

The molding compounds were prepared and molded using the procedure of Example 1 except that the curing cycle was 2.5 minutes. The properties of the molded and cured plaques are shown in Table 7B.

Omission of the silane compound resulted in a treating mix with such a high viscosity that processing was difficult. Omission of the mixture of alkaline earth metal hydroxides provided a composition that was still quite reactive and provided products with a good balance of physical properties as shown in Table 7B.

However, a superior product resulted from use of both the silane and mixed hydroxides in Formulation I.

TABLE 7A

| Component | Weight/Grams | | |
|---|---|---|---|
| | I | II | III |
| Liquid resole resin | 618 | 618 | 618 |
| Paragon clay | 287.5 | 287.5 | 287.5 |
| Uncoated Mistron talc | 287.5 | 287.5 | 287.5 |
| Zinc stearate | 18 | 18 | 18 |
| Gamma-amino propyl triethoxy silane | 25.8 | — | 25.8 |
| Foamaster III, anti-foam agent | 0.2 | 0.2 | 0.2 |
| Calcium hydroxide | 24.8 | 24.8 | — |
| Magnesium hydroxide | 24.8 | 24.8 | — |
| Fiberglass OCF 847 (¼ inch) | 364 | 364 | 364 |

TABLE 7B

| Properties - Products of Example 7 | | | |
|---|---|---|---|
| Formulation | I | II | III |
| Tensile Strength × $10^3$ psi | 5.0 | 3.0 | 3.9 |
| Tensile Modulus × $10^6$ psi | 1.21 | 1.08 | 0.94 |
| Flexural Strength × $10^3$ psi | 11.8 | 5.0 | 9.74 |
| Flexural Modulus × $10^6$ psi | 1.16 | 1.04 | 1.28 |
| Barcol Hardness | 46 | 20 | 16 |
| Notched Izod Impact - ft-lb/inch | 2.4 | 4.17 | 2.20 |
| Viscosity of Mixture, (× $10^3$) cps | 56 | 490 | 33 |
| Temperature, °C. | 39 | 29 | 26 |
| Normalized Viscosity at 29° C., (× $10^3$) cps | 100 | 490 | 25 |

EXAMPLE 8

Liquid mixes and dry mixes were prepared using the quantities shown in Table 8A.

Then, for each run the respective liquid and dry mixes were thoroughly mixed to form a treating mix which was deposited on a film of polyethylene in an SMC machine. Glass fibers were deposited on the moving film. A layer of treating mix was deposited on the glass, followed by a second polyethylene film. The composite was passed through a set of squeeze rolls. The thickened composite was rolled up and stored at 50 degrees C for a time of 48 hours.

Portions of the sheet molding compound were molded at 171° C. to form cured products having the properties shown in Table 8B. The cured product from Formulation A was found to have a limiting oxygen index of 67 and a specific optical density ($D_4$) of less than 10, when measured in accordance with ASTM E-662. Formulation A shows the improvement in properties provided by the inclusion of the glass beads in the compositions.

TABLE 8A

| | Proportions by Weight | | | |
|---|---|---|---|---|
| Run | A | B | C | D |
| Liquid Mix: | | | | |
| Resin of Example 5 | 38 | 34.15 | 41.9 | 40.0 |
| Gamma-amino propyl triethoxy silane | 1.54 | 1.71 | 0 | 0 |
| Dry Mix: | | | | |
| Calcium Hydroxide | 1.29 | 1.74 | 1.82 | 0.96 |
| Magnesium Hydroxide | 1.29 | 1.74 | 1.82 | 0.96 |
| Zinc Stearate | 1.29 | 1.74 | 1.82 | 0.96 |
| Paragon Clay | 10.8 | 14.46 | 15.2 | 7.99 |
| Mistron Talc | 10.8 | 14.46 | 15.2 | 7.99 |
| Glass Beads (Qcel-600) | 5.0 | 0 | 0 | 0 |
| Gamma-amino propyl triethoxy silane | 0 | 0 | 2.17 | 1.14 |
| Treating Mix: | | | | |
| Dry Mix to Resin Ratio | * | 20:20 | 20:22 | 11.5:23 |
| Glass, percent | 30 | 30 | 20 | 40 |

*25 parts resin to 3.3 parts beads to 16.8 parts other fillers.

TABLE 8B

| Properties of Products of Example 8 | | | | |
|---|---|---|---|---|
| Run | A | B | C | D |
| Tensile Strength (× $10^3$) psi | 11.0 | 7.6 | 6.4 | 16.3 |
| Tensile Modulus (× $10^6$) psi | 1.3 | 1.45 | 1.07 | 1.78 |
| Flexural Strength ($10^3$) psi | 24.6 | 16.5 | 19.8 | 23.2 |
| Flexural Modulus ($10^6$) psi | 1.33 | 1.42 | 1.15 | 1.53 |
| Notched Izod Impact Strength ft. lb/inch | 9.9 | 2.3 | 5.5 | 9.1 |

EXAMPLE 9

An SMC was prepared using the quantities shown in Table 9A. Resin, catalyst, silane compound and glass microballoons were mixed in a Cowles Mixer. The viscosity of the mix was 4672 cp at 40° C. The treating mix was spread over two polyethylene sheets over the area of 18 inches by 24 inches. The fiberglass was sprinkled over one sheet and the second sheet covered the first sheet containing glass. This sandwich was then rolled with a hand roller to wet glass and simulate an SMC process. This mixture has only 25 parts of filler per 100 parts by weight of resin. As indicated in Table 9B, most of the properties are comparable to other molding compounds. The specific gravity of about 1.6 is far superior to other mineral filled composites. The properties can be further improved on certain refinements and also when processed on an SMC machine.

TABLE 9A

| Component | Weight/Grams |
| --- | --- |
| Resin | 400 |
| Magnesium Hydroxide | 24 |
| Calcium Hydroxide | 16 |
| Gamma-aminopropyl triethoxy silane | 10 |
| Glass Microballoons | 100 |
| Fiberglass, OCF 847 (¼ inch) | 235.7 |

TABLE 9B

| | |
| --- | --- |
| Tensile Strength ($\times 10^3$) psi | 3.6 |
| Tensile Modulus ($\times 10^6$) psi | 0.91 |
| Flexural Strength ($\times 10^3$) psi | 10.6 |
| Flexural Modulus ($\times 10^6$) psi | 0.72 |
| Notched Izod Impact Strength ft-lb/inch | 3.56 |

We claim:
1. A phenolic molding composition comprising
(1) a resole pheolic resin,
(2) an alkaline earth metal hydroxide or oxide, or a mixture of more than one alkaline earth metal hydroxide or oxide or a silane compound, and
(3) a mixture of clay and tac fillers, wherein component (3) is present in said molding composition in a proportion of at least about 20 parts by weight per 100 parts by weight of said pheolic resin.

2. The composition of claim 1 wherein component (3) is a mixture of clay and talc, and wherein component (2) is calcium and/or magnesium hydroxide or oxide.

3. The composition of claim 2 wherein the weight ratio of calcium hydroxide or oxide to magnesium hydroxide or oxide is from about 100 to 0 to about 40 to 60.

4. A phenolic molding composition comprising
(1) a resole phenolic resin,
(2) a mixture of the oxide or hydroxide of calcium and magesium, and
(3) a mixture of clay and talc fillers, wherein component (3) is present in said molding composition in a proportion of at least about 20 parts by weight per 100 parts by weight of said phenolic resin.

5. The composition of claim 4 wherein the weight ratio of calcium hydroxide or oxide to magnesium hydroxide or oxide is from about 80 to 20 to about 40 to 60.

6. The composition of claim 4 wherein the weight ratio of clay to talc is in the range of about 60 to 40 to about 20 to 80.

7. The composition of claim 4 which also contains a silane compound.

8. The composition of claim 4 which also contains microspheres.

9. A phenolic molding composition comprising
(1) a resole phenolic resin,
(2) a mixture of calcium hydroxide and magnesium hydroxide wherein the weight ratio of calcium hydroxide to maagnesium hydroxide is from about 80 to 20 to about 40 to 60,
(3) a mixture of clay and talc fillers, wherein the weight ratio of clay to talc is in the range of about 60 to 40 to about 20 to 80, and
(4) a silane compound, wherein component (3) is present in said molding composition in a proportion of at least about 20 parts by weight per 100 parts by weight of said phenolic resin.

10. The phenolic molding composition of claim 9 which also contains microspheres.

11. A phenolic molding composition comprising
(1) a resole phenolic resin,
(2) a silane compound, and
(3) a mixture of clay and talc fillers, wherein the weight ratio of clay to talc is in he range of about 60 to 40 to about 20 to 80, and wherein component (3) is present in said molding composition in a proportion of at least about 20 parts by weight per 100 parts by weight of said phenolic resin.

12. A phenolic molding composition comprising
(1) a resole phenolic resin,
(2) an alkaline earth metal hydroxide or oxide, or a silane compound, and
(3) mirosphres, wherein component (3) is present in said molding composition in a proportion of at least about 10 parts by weight per 100 parts by weight of said phenolic resin.

13. The composition of claim 12 wherein component (2) is calcium and/or magnesium hydroxide or oxide.

14. The composition of claim 13 wherein the weight ratio of calcium hydroxide or oxide to magnesium hydroxide or oxide is from about 100 to 0 to about 40 to 60.

15. A phenolic molding composition comprising
(1) a resole phenolic resin,
(2) a mixture of the oxide or hydroxide of calcium and magnesium, and
(3) microspheres, wherein component (3) is present in said molding composition in a proportion of at least about 10 parts by weight per 100 parts by weight of said phenolic resin.

16. The composition of claim 15 wherein the weight ratio of calcium hydroxide or oxide to magnesium hydroxide or oxide is from about 80 to 20 to about 40 to 60.

17. The composition of claim 15 which also contains a silane compound.

18. A phenolic molding composition comprising
(1) a resole phenolic resin,
(2) a mixture of calcium hydroxide and magnesium hydroxide wherein the weight ratio of calcium hydroxide to magnesium hydroxide is from about 80 to 20 to about 40 to 60,
(3) a filler component consisting essentially of microspheres in a proportion of about 10 to less than 30 parts by weight per 100 parts by weight of said phenolic resin, and
(4) a silane compound.

19. A phenolic molding composition comprising
(1) a resole phenolic resin,
(2) a silane compound, and
(3) a filler component consisting essentially of microspheres in a proportion of about 10 to less than 30 parts by weight per 100 parts by weight of said phenolic resin.

20. A composition suitable for use in bulk molding comprising the compositon of claim 1 wherein the viscosity of the composition is in the range of about 100,000 to about 500,000 centipoises at 33° C.

21. A composition suitable for use in sheet molding comprising the composition of claim 1 wherein the viscosity of the composition is in the range of about 8000 to about 30,000 centipoises at 33° C.

22. A composition suitable for use in pultrusion molding, continuous laminating or filament winding processes comprising the composition of claim 1 wherein the viscosity of the composition is in the range of about 1000 to about 2000 centipoises at 33° C.

23. A composition suitable for use in bulk molding comprising the composition of claim 9 wherein the viscosity of the composition is in the range of about 100,000 to about 500,000 centipoises at 33° C.

24. A composition suitable for use in sheet molding comprising the composition of claim 9 wherein the viscosity of the composition is in the range of about 8000 to about 30,000 centipoises at 33° C.

25. A composition suitable for use in pultrusion molding, continuous laminating or filament winding processes, comprising the composition of claim 9 wherein the viscosity of the composition is in the range of about 1000 to about 2000 centipoises at 33° C.

26. The process comprising subjecting the phenolic molding composition of claim 1 and inert fibers to a bulk molding process and recovering the product of the process.

27. The process comprising subjecting the phenolic molding composition of claim 1 and inert fibers to a sheet molding process and recovering the product of the process.

28. The process comprising subjecting the phenolic molding composition of claim 1 and inert fibers to a pultrusion process and recovering the product of the process.

29. The process comprising subjecting the phenolic molding composition of claim 1 and inert fibers to a continuous laminating process and recovering the product of the process.

30. The process comprising subjecting the phenolic molding composition of claim 1 and inert fibers to a filament winding process and recovering the product of the process.

31. The process for producing a molding compound which comprises mixing the composition of claim 1 with inert fibers and converting the composition to a thickened state to produce a mechanically handleable molding compound.

32. The process for producing a sheet molding compound which comprises depositing the phenolic molding composition of claim 1 onto a first sheet, adding a layer of chopped fibers to the composition on the first sheet, depositing additional phenolic molding composition to the layer of chopped fibers, and pressing the resulting composite to form a mechanically handleable sheet molding compound.

33. The process of claim 32 wherein the sheet molding compound is warmed to form a strippable, moldable sheet molding compound.

34. The process for producing a pultruded product which comprises passing a filament into a vessel containing the phenolic molding composition of claim 1 to saturate the filament, passing the resulting filament through an orifice to squeeze out excess phenolic molding composition and compress the resulting composite, and passing the resulting composite through an extrusion die to heat and cure the product.

35. The molded and cured product of the process of claim 26.

36. The molded and cured product of the process of claim 27.

37. The cured product of the process of claim 28.

38. The cured product of the process of claim 29.

39. The cured product of the process of claim 30.

* * * * *